United States Patent [19]

Durno et al.

[11] 4,170,147

[45] Oct. 9, 1979

[54] REDUNDANT FLIGHT CONTROL SYSTEM

[75] Inventors: Ronald A. Durno; Dean E. Cooper, both of Trumbull, Conn.

[73] Assignee: United Technologies Corporation, Hartford, Conn.

[21] Appl. No.: 846,094

[22] Filed: Oct. 27, 1977

[51] Int. Cl.² .................................................. F16H 21/44
[52] U.S. Cl. ............................................. 74/96; 244/232; 244/83 K; 74/501 R
[58] Field of Search ............... 244/83 K, 83 G, 83 J; 188/106 R, 204 R; 74/110, 96

[56] References Cited

U.S. PATENT DOCUMENTS

| | | | |
|---|---|---|---|
| 1,996,332 | 4/1935 | Grinslade | 188/204 R |
| 2,304,487 | 12/1942 | Stinson | 244/83 J |
| 2,430,869 | 11/1947 | Fulton, Jr. | 244/83 I |
| 2,669,401 | 2/1954 | Bosserman | 74/96 |
| 2,778,455 | 1/1957 | Roach | 188/204 R |
| 3,031,036 | 4/1962 | Meyers | 188/106 R |

*Primary Examiner*—Benjamin W. Wyche
*Assistant Examiner*—Wesley S. Ratliff, Jr.
*Attorney, Agent, or Firm*—Vernon F. Hauschild

[57] ABSTRACT

A flight control system utilizing pilot actuated flexible cables to selectively move a control quadrant and utilizing balanced, preloaded springs connected to the quadrant to be selectively automatically releasable in response to cable severance so that the quadrant can be pilot actuated through its full control regime despite the severance of one of the cables.

7 Claims, 2 Drawing Figures

REDUNDANT FLIGHT CONTROL SYSTEM

The invention herein described was made in the course of or under a contract or sub-contract thereunder, with the Department of the Army.

BACKGROUND OF THE INVENTION

1. Field of Invention

This invention relates to aircraft flight control systems wherein the pilot actuates flexible cables to selectively position a control quadrant and thereby effect the desired flight control and more particularly to such a system which is redundant and which can continue to be operated throughout its full control regime despite the severance of one of the cables.

2. Description of the Prior Art

In this flight control art, centering springs have been used to position the quadrant under control by flexible cables to a preselected setting, should one of the flexible cables be severed. By selective control rigging, such emergency positioning can provide a predetermined amount of anti-torque and directional control to the tail rotor of a helicopter, for example. However, in such a system the pilot has only this minimal control following cable severance which may not be adequate to cover the wide range of anti-torque requirements with varying helicopter gross weight and ambient operating conditions and would be inadequate for primary surfaces required for pitch and roll control.

In addition, duplicate flexible cable systems and rigid push-pull tube-cable systems have been utilized, but these have proven to be unduly heavy, expensive and occupy a large space envelope. There are many prior patents, such as U.S. Pat. No. 2,280,106, which include mechanism brought into play upon the severance of a cable which serves to prevent a "hard over" of the flight control surface under control but in all such systems the pilot cannot exercise control following a cable severance.

SUMMARY OF THE INVENTION

A primary object of the present invention is to provide an improved flight control system in which pilot actuated flexible cables are connected to a control quadrant in a manner to provide redundant control of the quadrant so that severance of either flexible cable will not cause the pilot to lose control of the quadrant.

It is a further object of the present invention to teach such an improved flight control system which can be utilized with at least one additional quadrant positioning mechanism to provide additional system redundancy.

It is a further object of the present invention to provide such a flight control system which is not only redundant but which is light in weight and simple in construction so as to afford ease of maintenance, and which fits into a minimal space envelope.

It is still a further object of the present invention to teach such a flight control system which occupies a minimal space envelope and in which short, heavy balancing spring members are releasably connected to the control quadrant so that, in response to severance of one of the flexible cables, the balancing spring connected to the opposite side of the control quadrant from the severed cable will be unloaded so that thereafter the control quadrant can continue to be pilot operated throughout its full control regime in that the remaining preloaded balancing spring acts to move the control quadrant in one rotational direction and the pilot can apply tension to the unsevered flexible cable to overcome the remaining preloaded balancing spring so as to move the control quadrant in the opposite rotational direction and thereby position the control quadrant in any selected position throughout its full flight range.

DESCRIPTION OF THE PREFERRED EMBODIMENT

Figure 1:
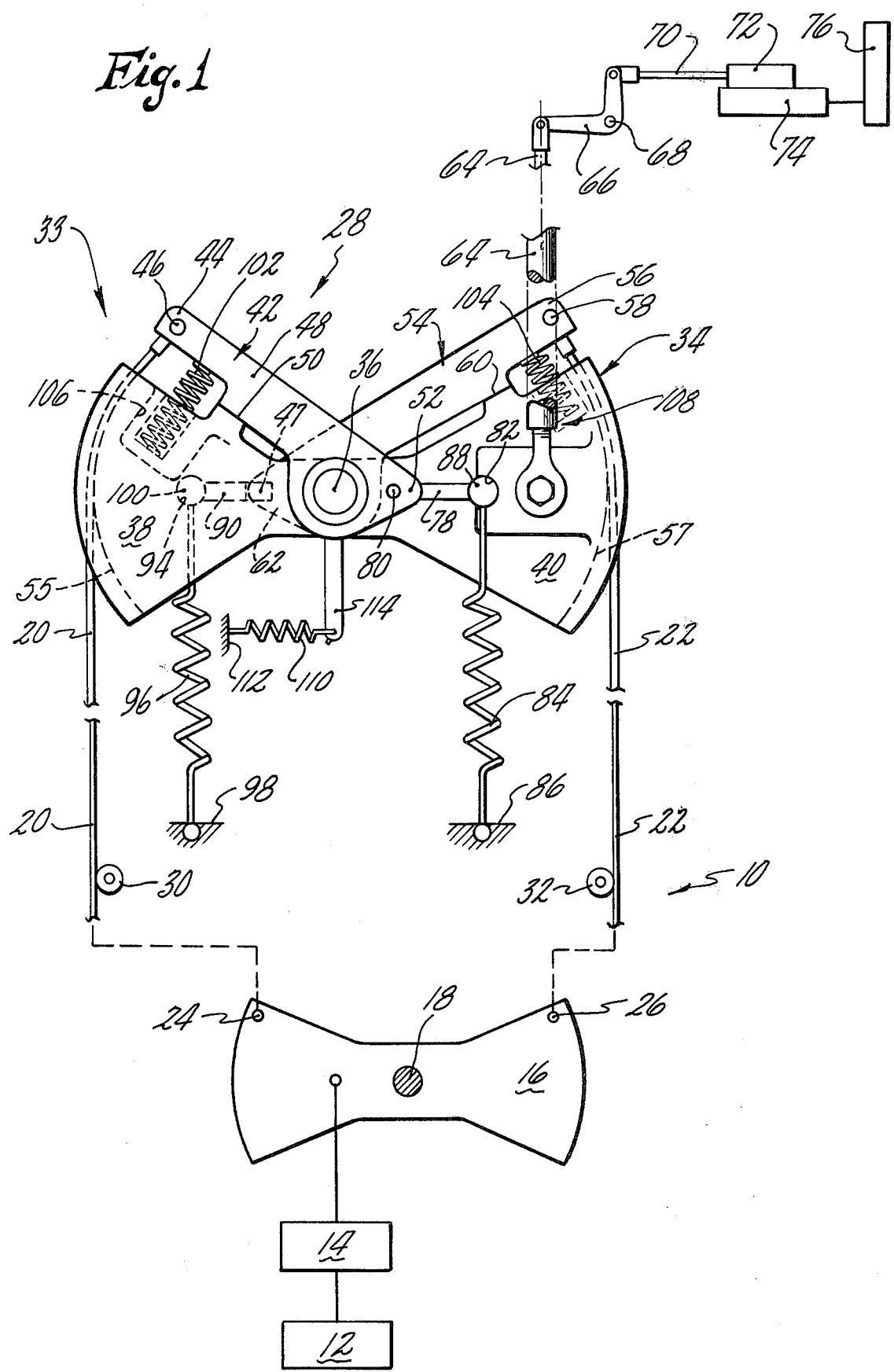
FIG. 1 is a showing of our redundant flight control system in its normal operating mode with both flexible cables operative to selectively position a control quadrant throughout its full control range.

Referring to FIG. 1 we see flight control system 10 which illustrates our redundant flight control system actuating the pitch change servo of a helicopter tail rotor, but it will be evident to those skilled in the art that our flight control system could be used to control any control member or surface of a flight vehicle. Flight control system 10 includes pilot actuated foot pedals 12 which act through conventional mixing unit 14 to selectively position control quadrant 16, which is mounted for rotation about axis of rotation 18. Flexible cables 20 and 22 attach to opposite sides of control quadrant 16 at connecting points 24 and 26, respectively, and project therefrom to be connected to control quadrant 28 in a manner to be described hereafter so that, through the pilot actuation of foot pedals 12, control quadrant 28 will be caused to follow the motion of control quadrant 16 due to the selective tension loading of flexible cables 20 and 21 effected by the pilot in actuating pedals 12. As used herein, "flexible" cables are cables which are capable of flexing but not stretching. Cables 20 and 22 are guided in their path between quadrants 16 and 28 so as to be free of obstructions and to preferably proceed in parallel relationship, by one or more pulley or roller members 30 and 32 in conventional fashion. Control quadrant assembly 33 consists of one-piece control quadrant 34 which is mounted for rotation about axis of rotation 36 and includes left arm member 38 and right arm member 40 projecting laterally on opposite sides of axis 36. Arm member 42 is pivotally connected to quadrant 34 so as to be rotatable about axis 36 and includes a first end 44 which, as shown in FIG. 1, is attached at connecting point 46 to cable 20 so that tension loading of cable 20 causes arm member intermediate portion 48 to bear against the left arm 38 of control quadrant 34 at contact surface 50. The opposite end 52 of arm member 42 is located on the opposite side of axis 36 from end 44 thereof. In similar fashion, another arm member 54 is pivotally connected to control quadrant 34 for rotation about axis 36, and one of its ends 56 is connected to cable member 22 at connecting point 58 such that tension loading of cable 22 causes arm member 54 to come into contact with control quadrant 34 at surface 60, while the opposite end 62 of arm member 54 is located on the opposite side of axis 36 from end 56. As shown in the FIG. 1 normal mode of operation, arm members 42 and 54 bear against and rotate with control quadrant 34 about axis 36. Cables 20 and 22 pass through peripheral grooves 55 and 57 of quadrant 34.

Output shaft 64 is pivotally connected to and projects from control quadrant 34 and is illustrated as causing bell crank 66 to pivot about pivot point 68 and thereby actuate control rod 70 which, in turn, controls the pilot valve 72 of pitch change servo 74 of helicopter tail rotor 76.

Still viewing FIG. 1 we see that link member 78 is pivotally connected to arm 42 at pivot point 80 and projects therefrom to be received in locking recess 82 of control quadrant right arm 40. One of the balancing springs 84, which projects from helicopter fixed point 86, is connected at its opposite end 88 to link 78. The over-center position of link 78 locks the end 88 of control quadrant 34.

Similarly, link 90 is pivotally connected at pivot point 92 to arm member 54 and projects therefrom to be received in locking recess 94 of the left arm 88 of control quadrant 34. The second balancing spring 96, which is connected at one end to helicopter fixed point 98 is connected at its opposite end 100 to link 90. The over-center position of link 90 locks the end 100 to the right arm 38 of control quadrant 34. Balancing springs 84 and 96 are equally loaded so as to impose a balanced centering force upon quadrant 34. There will be an increase in pedal force in both directions from center position in proportion to the stiffness of the balancing springs.

Biasing springs 102 and 104 are positioned in recesses 106 and 108, respectively, of quadrant left arm 38 and right arm 40. These biasing springs 102 and 104 serve to force arm members 42 and 54 away from and out of contact with control quadrant 34. In the normal operating mode shown in FIG. 1, the tensioning loads normally imposed on cables 20 and 22 as control 10 is rigged serve to overcome the force of biasing springs 102 and 104 so that arm members 42 and 54 are normally held in contact with surfaces 50 and 60 of control quadrant 34.

One of the advantages of our flight control construction is that it can be located in a minimal space envelope in that balancing springs 84 and 96 can be short, very stiff springs which, in our construction, are not operating at the outer periphery or diameter of the control quadrant 34 but at a station substantially inboard thereof as shown.

In addition, this redundant quadrant can be installed in place of the standard helo tail rotor quadrant without going outside of any surface lines. One problem of adding springs to quadrants used to control tail rotor pitch is that of finding means and suitable locations to anchor the fixed end of the spring. This is because the final quadrant is high on the pylon, attached to the gear box, and space is minimal for any added mechanisms.

With our flight control system operating in its FIG. 1 normal mode of operation, it will be seen that by the pilot applying a tension load to flexible cable 20, control quadrant 34 will be caused to rotate in a counterclockwise direction to selectively position control output rod 64, and hence servo 74 and so provide a control input to the pitch of helicopter tail rotor 76. Similarly, if a tension loading is applied by the pilot to flexible cable 22 this will cause a clockwise rotation of control quadrant 34 to move output rod 64 in the opposite direction and similarly change the pitch of tail rotor 76.

One of the problems of prior art quadrant control systems is that the pilot loses control of the quadrant when one of the flexible cables 20 or 22 is severed. In our flight control system 10, the pilot is able to continue to control quadrant 34 throughout its full control range despite the fact that one of the flexible cables is severed.

Figure 2:
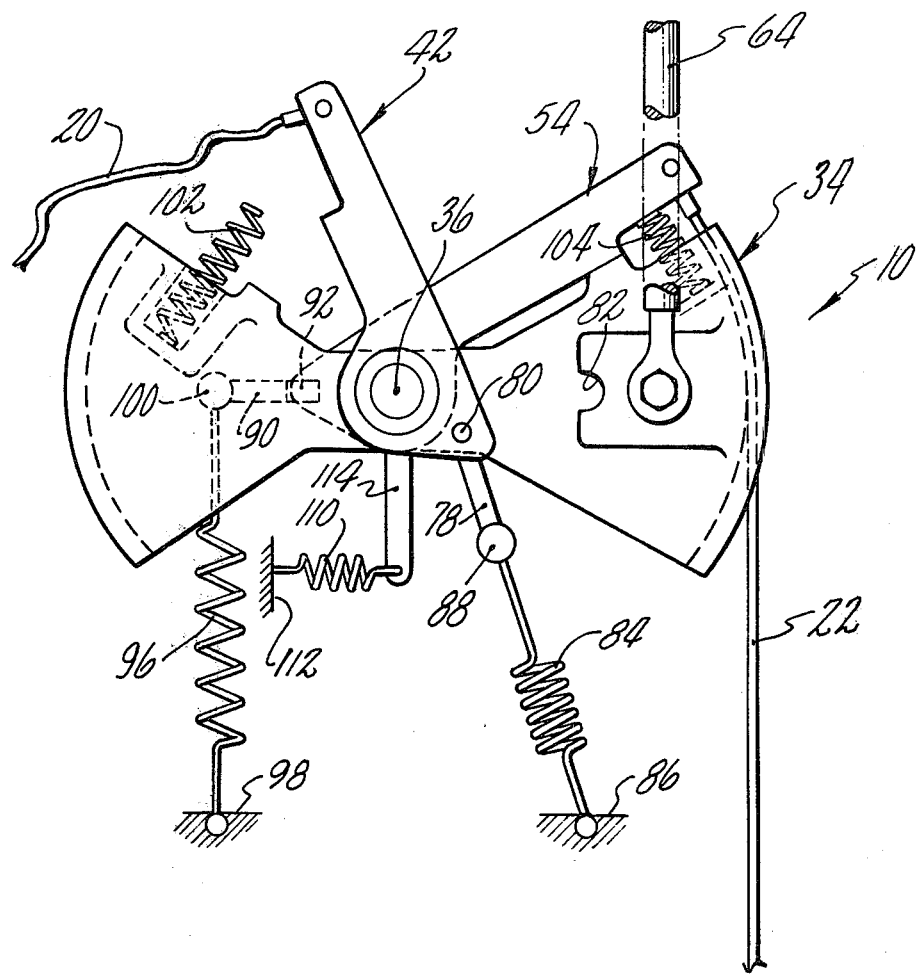
FIG. 2 is a showing of the control quadrant portion of our FIG. 1 system illustrating the control quadrant in its mode of operation when one of the flexible cables has been severed, thereby unloading one of the balancing springs.

To illustrate the redundancy of our system 10, it will be assumed that flexible cable 20 is severed in operation. When this occurs, as best shown in FIG. 2, biasing spring 102 forces arm 42 away from control quadrant 34 and causes it to rotate in a clockwise direction, thereby drawing link 78 out of contact with locking recess 82 to thereby unload balancing spring 84 so that only preloaded balancing spring 96 is now operating on quadrant 34. Spring 96 applies a force to cause quadrant 34 to rotate in a counterclockwise direction throughout its full flight range. When the pilot wants quadrant 34 to be positioned at an intermediate position, he can apply tension loading to cable 22 so as to overcome the force of the remaining balancing spring 96 and thereby move the quadrant 34 in a clockwise direction to its desired control position. If, at any time, further counterclockwise rotation is desired of control quadrant 34, such can be accomplished by the pilot by merely releasing tension on the unsevered cable 22 and spring 96 will bring the control quadrant 34 to the desired position. It will accordingly be seen, that by the coaction of the remaining loaded balancing spring and the pilot actuated unsevered cable, the pilot continues to have control of quadrant 34 throughout its full control range.

Similarly, had cable 22 been severed, arm 54 would have so acted to unload balancing spring 96 and the pilot could so utilize the remaining preloaded balancing spring 84 and the unsevered cable 20 to control the position of control quadrant 34 throughout its full control range.

It will therefore be seen that our flight control system is triply redundant in that it can be pilot controlled throughout its full control range when the system is in its FIG. 1 normal operating position by the pilot selectively applying tension loads to cables 20 or 22, by the pilot selectively applying a tension load to cable 22 when cable 20 is severed as shown in the FIG. 2 embodiment, and by the pilot selectively applying a tension load to cable 20 when cable 22 is severed.

Our control system could be made quadruply redundant by the addition of a conventional centering spring 110 thereto so as to act, as best shown in FIG. 1, between fixed station 112 and arm member 114 which projects from and rotates about axis 36 with control quadrant 34.

While not necessarily so limited, centering spring mechanism 110 may be of the type shown in U.S. Pat. No. 3,532,302 issued to J. C. Dean on an Improved Tail Rotor Biasing Device.

As described in our copending application filed on even date herewith entitled Redundant Flight Control System in the name of Dean Cooper, tension indicators could be placed in cables 20 and 22 to alert the pilot to the number of control options available to him.

Further details of our flight control system 10 to which this invention does not relate and to tail rotor pitch change servo 74 will be found in U.S. Pat. No. 3,199,601 issued to J. C. Dean et al on an Improved Flight Control System to which reference is hereby made.

I wish it to be understood that I do not desire to be limited to the exact details of construction shown and described, for obvious modifications will occur to a person skilled in the art.

I claim:

1. A flight control system including:

(A) a quadrant member mounted for clockwise and counterclockwise motion about an axis of rotation and including a left arm member and a right arm member extending on opposite sides of the axis of rotation, (B) output means responsive to quadrant rotation, (C) a first flexible cable member connected to the quadrant right arm to cause clockwise rotation thereof, (D) a second flexible cable member connected to the quadrant left arm to cause counterclockwise rotation thereof, (E) a pair of balancing spring members with a first spring member thereof connected to the right arm of the quadrant member and the second spring member connected to the left arm of the quadrant member so as to impose a balanced centering force on said quadrant member, (F) means responsive to the severing of one of said flexible cable members to inactivate one of said balancing spring members so that the remaining balancing spring member imparts a force to the quadrant member to cause it to rotate in one direction about its axis of rotation while a tensioning force applied to the unsevered flexible cable member will cause the quadrant member to rotate in the opposite rotational direction about its axis of rotation to selectively position the quadrant member.

2. A control system according to claim 1 and including:

(A) a first arm member mounted for rotation about the quadrant member axis of rotation and connected to said first flexible cable member so that tension loading of said first flexible cable member will cause said first arm member to bear against and rotate with the right arm of the quadrant member, (B) first locking means normally locking the second spring member to said quadrant left arm with the first arm member bearing against the quadrant member right arm and responsive to said first arm motion away from said quadrant right arm to unlock said locking means and unload said second spring member, (C) a second arm member mounted for rotation about said quadrant member axis of rotation and connected to said second flexible cable so that tension loading thereof will cause said second arm member to bear against and rotate with said quadrant member left arm, and (D) second locking means normally locking the first spring member to said quadrant member right arm with said second arm member positioned against the quadrant left arm and responsive to second arm motion away from said left arm to unlock said second locking means and unload the first spring member so that severing of either of said flexible cable members will unload the spring member connected to the opposite arm of the quadrant member, and so that the remaining spring member will apply a force to the quadrant member to cause it to rotate in the direction that the severed flexible cable member normally caused the quadrant to rotate in and so that the application of tension loading in the unsevered flexible cable member overcomes the spring force to selectively position the quadrant member.

3. A control system according to claim 2 and including biasing spring means normally compressed between each of said first and second arm members and said quadrant member arm members and operable when the associated flexible cable member is severed to cause the associated arm member to move away from the quadrant member arm and thereby unlock the locking means which had been connecting the spring member to the opposite quadrant member arm thereby unloads said spring member.

4. A control system according to claim 3 wherein each of said arm members includes a first end connected to its associated flexible cable member, and intermediate portion which normally contacts the associated quadrant member arm, and an opposite end positioned on the opposite side of the axis of rotation from the first end.

5. A control system according to claim 4 and including locking recesses in each of said quadrant member left and right arms, and a link member pivotally connected to each arm member opposite end and extending therefrom to be engaged in the locking recess of the associated arm of the quadrant member when the arm member is in its locked position and in contact with the opposite arm member of the quadrant member and, wherein the associated balancing member is connected to the opposite end of the link so that, when said arm member pivots to an unlocked position out of contact with its associated quadrant member arm the link member will be retracted from the locking recess to unload the associated balancing spring member.

6. A control system according to claim 5 and including recess means in each of said left and right arms of said quadrant member to receive said biasing spring means and oriented so that when said arm members are in locked position in contact with said associated left or right arm of the quadrant member, said biasing spring means are compressed between said quadrant member and said arm member and so that when the associated flexible cable connected to the arm member first end is severed, the biasing spring means will serve to bias the arm member out of contact with the quadrant member and retract said locking link from said locking recess to unload the associated balancing spring member.

7. A flight control system according to claim 5 wherein said locking recesses are located at a station substantially inboard of the outer periphery of the control quadrant so that the balancing spring members may be short strong springs to permit positioning our flight control system in a minimal space envelope.

* * * * *